July 31, 1956 C. LOWERY 2,756,767

AUTOMATIC DUMP VALVE FOR FLUID LINES

Filed March 13, 1953 2 Sheets-Sheet 1

Charley Lowery
INVENTOR,

BY Bernard P. Miller
ATTORNEY

July 31, 1956 C. LOWERY 2,756,767
AUTOMATIC DUMP VALVE FOR FLUID LINES
Filed March 13, 1953 2 Sheets-Sheet 2
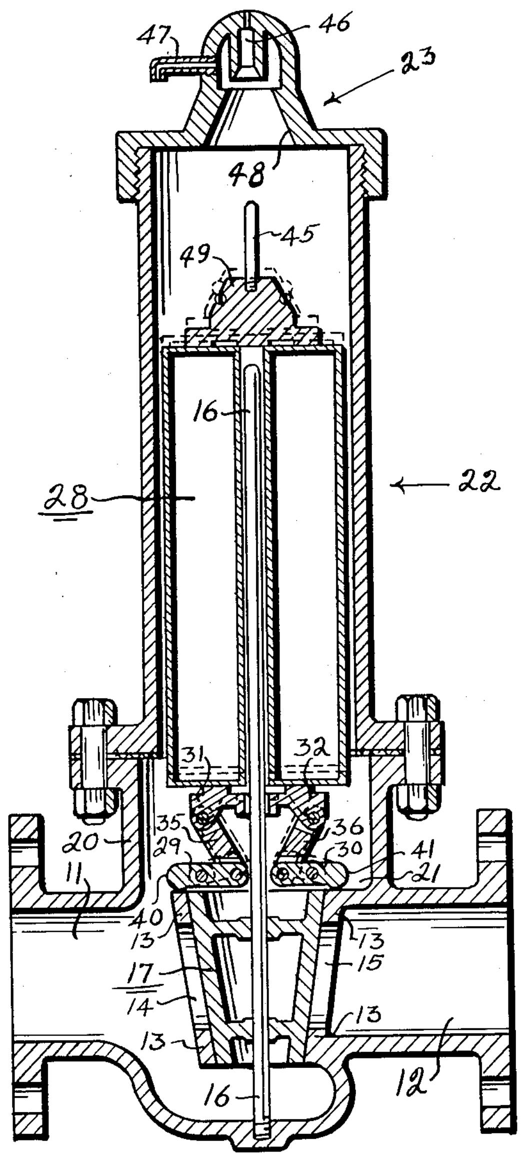
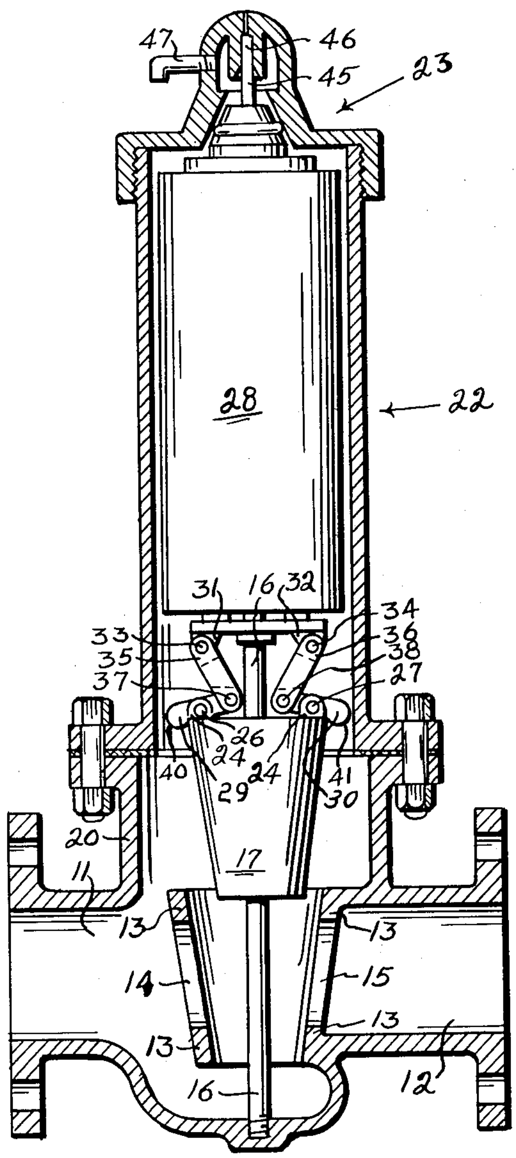
Charley Lowery
INVENTOR,
BY
Bernard P. Miller
ATTORNEY United States Patent Office 2,756,767

Patented July 31, 1956

2,756,767

AUTOMATIC DUMP VALVE FOR FLUID LINES

Charley Lowery, Oklahoma City, Okla.

Application March 13, 1953, Serial No. 342,072

3 Claims. (Cl. 137—397)

The present invention relates to cut-off valves for fluid conveying pipe lines, and more particularly to valves equipped for automatic operation by float actuated mechanism.

The prime object of the present invention is to provide a float operated valve for automatically emptying oil and gas separators, and the like, when the liquid in such vessels has reached a predetermined level.

In the oil field industry, stock tanks are filled with crude oil as it comes from the well. These stock tanks are usually connected to a pipe line for conveying the oil to a processing plant. Where the topography will permit it, the oil flows from the stock tanks into an oil gathering system by gravity. It is therefore quite important that the stock tanks being drained by gravity should not be allowed to be drained to such a level that air enters the pipe line, because this causes an "air-lock" and retards the draining of other tanks within the system.

An equally important object of the present invention is to provide a float operated valve for stopping the flow of oil, from an oil tank being drained, before the level of the oil within the tank becomes so low that air is allowed to enter the drain line.

In pipe lines conveying certain types of fluids, float operated cut-off valves often become stuck or "frozen" in their closed position, due to the gravitational deposit of extraneous matter which is entrained in the fluid. In other conveyor pipes, the high fluid pressures therein often tend to hold or "lock" the valve in a closed position. In either event, it is usually found impractical to attempt to open such valves solely by the use of a float.

An object of the invention is to provide a float operated mechanism designed to break the seated valve loose, even though it is "frozen" or stuck to a usual extent.

With the mechanism of the present invention installed in a tank-bleeding pipe line, the question of whether or not the tank will be bled at the proper time, is eliminated, and there is no longer any necessity for a person to periodically inspect the tank and the mechanism, to insure against the tank being over-filled. Time and worry are thereby eliminated.

A further object is to provide a dependable float operated tank-bleeding mechanism which has few moving parts to become worn, or to get out of order.

Other objects will be apparent from the following description when taken in conjunction with the accompanying two sheets of drawings, wherein:

Figure 2 is a vertical sectional view of the device with the valve in closed position;

Figure 3 is a similar view with the valve in fully open position; and

Like characters of reference designate like parts in those figures of the drawings in which they occur.

In the drawings:

Figure 1:
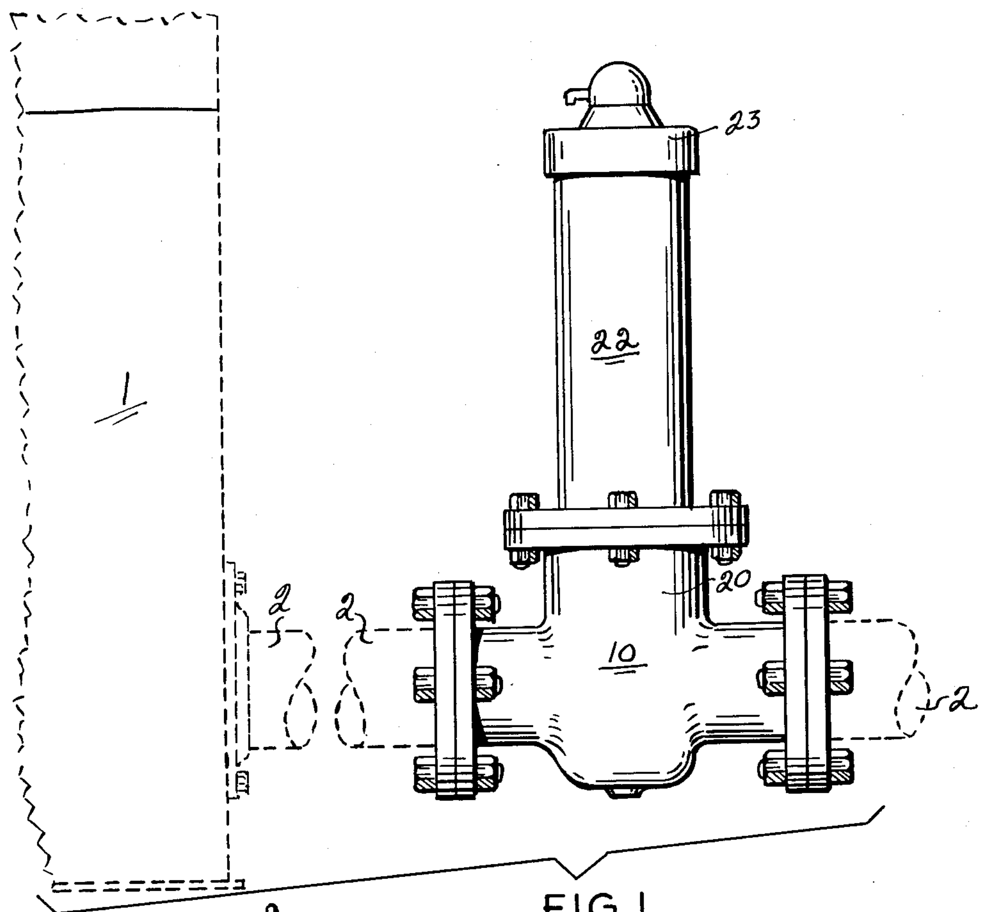
Figure 1 is a side elevational view of the mechanism of the present invention, and illustrating it operatively installed in position to automatically bleed a storage tank, the tank being shown in dotted lines.
Figure 4:
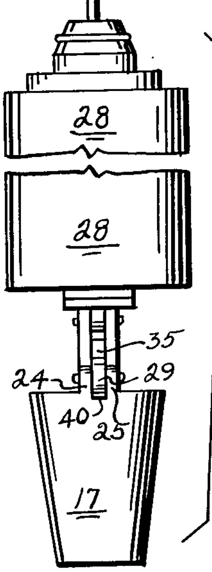
Figure 4 is a side elevational view of the float and the valve.

The reference numeral 1 indicates a storage tank for liquid, said tank having an outlet pipe or conveyor line 2 for bleeding or draining the same. It is upon the line 2, or some comparable line which may periodically need opening, that the valve mechanism of the present invention is designed to function.

In the type of installation shown in Fig. 1, a conventional cut-off valve or stop, not shown, is usually installed in the line 2 between the tank 1 and the mechanism of the present invention. This cut-off valve remains closed until such time as it is desired to drain the tank 1. The cut-off valve is then opened and the mechanism of the present invention acts to drain the tank and close the line 2 before air can enter it without the necessity of the operator returning to closely watch the level of the oil in the tank 1. The operator may close the cut-off valve at any convenient time after the tank has been drained to the proper level. The mechanism of the present invention is arranged to drain the tank 1 each time the liquid therein reaches a predetermined high level.

The device of the invention, per se, consists substantially of a lower section 10 flanged in a conventional manner to be coupled in and to form a continuation of the tank drain line 2, the section 10 has aligned inlet and outlet bores 11 and 12 through which fluid may pass from one section to the other of the pipe line 2. Within the section 10, and between the inlet bore 11 and the outlet bore 12, there is provided a conically tapered valve seat 13 having horizontally aligned ports 14 and 15.

The bottom wall or floor of the section 10 is vertically bored and tapped to receive the lower end of a guide rod 16 which extends upwardly through the seat 13, and upon which is slidably mounted a conically tapered valve 17. The valve 17 is adapted, when at the lower end of its travel, to seat within the seat 13 and hermetically close the ports 14 and 15 (Fig. 2). By raising the valve 17 to the position of Fig. 3, the ports 14 and 15 are opened so that the liquid may flow from the bore 11 to the bore 12, and thence into the pipe line 2 again.

As a means for lifting the valve 17 when liquid from the tank 1 is admitted to the mechanism, the following described float structure is provided.

The section 10 is built in the form of a pipe T, having a vertical hollow cylindrical leg 20 communicating with the bores 11 and 12. The rod 16 extends upwardly through the bore 21 of the T leg 20, for a purpose more fully described hereinbelow.

The vertical leg 20 is flanged to connect the lower end of a hollow cylindrical float chamber 22, having a removable cap 23 closing its upper end. Slidably disposed upon the guide rod 16, and movable in the chamber 22, is a hollow hermetically sealed float 28 of some light weight metal, plastic, or other suitable material which has sufficient buoyancy to float upon the liquid being stored in the tank 1.

The valve 17 has two pairs of oppositely disposed upstanding ears 24 and 25, each pair of which are alignedly bored transversely to receive a pivot pin. The two pivot pins are indicated by the reference numerals 26 and 27 respectively.

Intermediate its ends, a short lever arm 29 is pivotally mounted on the pivot pin 26, and a similar lever arm 30 is similarly mounted on the pivot pin 27. The lever arm arrangement is such that the adjacent ends of the lever arms 29 and 30 swing toward and away from each other in a vertical path.

The bottom of the float 28 is equipped with two depending pairs 31 and 32 of spaced parallel ears, and each pair is alignedly bored transversely to receive a horizontal pivot pin. The two pivot pins are indicated by the reference numerals 33 and 34 respectively. The pivot pins 33 and 34 respectively engage the upper ends of two straight links 35 and 36, the lower ends of which are pivotally connected respectively to the inner or upper ends of the two lever arms 29 and 30. Suitable horizontal pivot pins 37 and 38 act to make this latter pivotal connection.

It is thought to be obvious from the above description that the weight of the float 28 and valve 17 will, through gravity, cause the valve to seat in the seat 13 and close any communication between the horizontal inlet and outlet bores 11 and 12, when the float housing is full of sufficient liquid to cause the float 28 to be raised. It is also thought to be obvious that should liquid enter the inlet 11 and build up in the housing 22 to a height sufficient to raise the float 28, then the links 35—36 and the arms 29—30 will combine to lift the valve 17 therewith.

It was stated hereinabove that the two lever arms 29 and 30 were pivotally connected "intermediate their ends". It was also described that the inner ends of the two lever arms 29 and 30 were pivotally connected to the links 35 and 36 respectively. Such an arrangement leaves the outer end of each lever arm 29 and 30 free to pivot in vertical paths when the float 28 is raised or lowered. These outer ends of the two lever arms 29 and 30 are rounded, and are indicated respectively by the reference numerals 40 and 41.

Attention is particularly directed to the horizontal positions of the lever arms 29—30 when the valve 17 is in its closed position, and to the fact that these two lever arms are resting flatly upon the upper flat horizontal end of the valve seat 13 (Fig. 2).

Should, as often occurs between operations of the mechanism, the valve 17 become stuck or frozen in its seat 13, the rounded ends 40 and 41 of the lever arms 29 and 30 act as lifting cams for the valve, when liquid builds up in the housing 22 sufficiently to normally raise the float 28. In other words, the arm ends 40 and 41 bear downwardly against the upper flat ends of the valve seat 13, and pry the valve loose from its seated position.

Consequently, if the mechanism is properly designed for the liquid commodity it is to handle, there is never any question of the valve being lifted when liquid enters and fills the housing or dome 22 from the tank 1.

As a means for allowing the float 28 to lower the valve 17 and thus close the ports 14 and 15 before air gets into the line 2 from the tank 1, the bottom surface of the cap 23 is provided with a vent pipe 47 in communication with the interior of the chamber or housing 22 for releasing trapped air above the float 28 and for admitting air into the chamber 22 when the level of the oil within the tank 1 reaches a low level slightly above the outlet end of the pipe 2. This admission of air above the float 28 allows the float to float within the chamber 22 at substantially the same level as it would were it disposed within the tank 1. It seems obvious therefore that when the level of the fluid within the tank 1 reaches a level such as the height of the flanged connection between the lower section 10 and the chamber 22, that the float 28 will be low enough that the valve 17 will be seated within its seat 13 and the flow of fluid through the ports 14 and 15 stopped, while the level of the oil is still above the pipe line 2, thereby preventing the entry of air into the gravity or pumping system.

As a means for preventing the loss of oil or other fluid from the chamber 22 through the vent 47 when the tank 1 is opened to drain, the upper surface of the float is provided with a centrally disposed conical upstanding valve core 49 which seats within a co-operating outwardly flared conical recess or seat 48 axially disposed within the lower surface of the cap 23. The lower or bottom surface of the cap 23 further contains a vertically disposed socket 46, which acts as a guide for the valve core 49 into the seat 48 by seating or nesting a rigid upstanding spike or rod 45 carried on the upper end of the valve core 49. The length of the spike 45 is such that it will not contact the upper end of the socket 46, thus insuring a positive seat of the core 49 within the seat 48 by the bouyantly upward-thrust of the float 28.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In an automatic float controlled valve assembly, the combination with a storage tank operatively connected to a liquid conveying pipe line, and with a valve housing having a fluid passageway in communication with said pipe line, said housing having a vertically opening valve surrounded by a valve seat for opening and closing the passageway, of: an elongated vertical chamber for liquid above and in communication with said valve housing; a guiding stem vertically disposed centrally within said chamber rigidly connected at its lower end to the bottom of said housing; a float centrally disposed in said chamber and vertically slidable around said stem; lever arms pivotally connected intermediate their ends to said valve, said arms projecting outwardly from said valve adjacent the upper end of said seat; and intermediary links pivotally connected to said float and to the inner ends of said lever arms, whereby liquid entering the chamber lifts the float and intermediary links and the inner ends of the lever arms, causing their outer ends to rest on the valve seat and fulcrum thereagainst, thereby lifting the valve.

2. In an automatic float controlled valve assembly, the combination with a storage tank operatively connected to a liquid conveying pipe line, and with a valve housing having a fluid passageway in communication with said pipe line, said housing having a vertically moving first valve seat for opening and closing the passageway, of: an elongated vertical chamber for receiving liquid and for communication with said valve housing; a second valve seat in the upper end of said chamber in communication with the atmosphere for venting or admitting air; a stem vertically disposed centrally within said chamber rigidly connected at its lower end to the bottom of said housing; a float centrally disposed in said chamber and vertically slidable around said stem; a valve core rigidly carried by the upper end of said float for seating within said second valve seat when the float is raised; lever arms pivotally connected intermediate their ends to said first valve, said arms projecting outwardly from said first valve adjacent the upper end of said first valve seat; and intermediary links pivotally connected to said float and to the inner ends of said lever arms, whereby liquid entering the chamber lifts the float, seals the air vent by seating the valve core, and lifts the intermediary links and the inner ends of the lever arms causing their outer ends to rest on the first valve seat and fulcrum thereagainst to lift the seat valve.

3. Structure as specified in claim 2, and guide means for centering said valve core within said second valve seat, said means including a vertically disposed socket in the upper end of said chamber; and an upstanding spike rigidly carried by said valve core.

References Cited in the file of this patent

UNITED STATES PATENTS

| | | |
|---|---|---|
| 471,537 | Craigie | Mar. 29, 1892 |
| 727,503 | Walker | May 5, 1903 |
| 748,046 | Byers | Dec. 29, 1903 |
| 827,549 | Mauritzen | July 31, 1906 |
| 1,007,191 | Foley | Oct. 31, 1911 |
| 1,067,273 | Rice | July 15, 1913 |
| 1,121,596 | Bannister | Dec. 15, 1914 |
| 1,277,602 | Keenan | Sept. 3, 1918 |
| 1,510,939 | Hurst | Oct. 7, 1924 |
| 1,906,277 | McGee | May 2, 1933 |
| 1,998,478 | Williams | Apr. 23, 1935 |
| 2,028,816 | Allen | Jan. 28, 1936 |

FOREIGN PATENTS

| | | |
|---|---|---|
| 21,493 | Great Britain | Oct. 27, 1899 |